United States Patent
Sims

[19]

[11] Patent Number: 5,827,068
[45] Date of Patent: Oct. 27, 1998

[54] FRUIT PACKAGING TRAY USABLE WITH A DENESTING APPARATUS

[75] Inventor: Russel E. Sims, Yakima, Wash.

[73] Assignee: Michelson Packaging Co., Yakima, Wash.

[21] Appl. No.: 775,667

[22] Filed: Dec. 31, 1996

[51] Int. Cl.⁶ .............................. A01F 25/14; B65D 1/36
[52] U.S. Cl. ................. 414/795.6; 206/518; 206/521.8; 229/407; 414/797.8
[58] Field of Search .................................. 206/515, 518, 206/564, 521.8; 229/407; 414/795.6, 796.4, 797.8; 221/210, 213, 217, 220

[56] References Cited

U.S. PATENT DOCUMENTS

| | | | |
|---|---|---|---|
| D. 304,678 | 11/1989 | Vigue | D9/341 |
| D. 327,841 | 7/1992 | Letourneau | D9/348 |
| 3,040,923 | 6/1962 | Leitzel | 217/26.5 |
| 3,245,570 | 4/1966 | Friday | 217/26 |
| 3,334,765 | 8/1967 | Modersohn | 217/26.5 |
| 3,352,477 | 11/1967 | Eisenberg | 229/40 |
| 3,416,690 | 12/1968 | Michael | 217/26.5 |
| 3,651,976 | 3/1972 | Chadbourne | 220/23.4 |
| 3,732,976 | 5/1973 | Bessett et al. | 206/65 R |
| 3,749,235 | 7/1973 | Boursier | 206/45.31 |
| 3,843,009 | 10/1974 | Emery | 217/26.5 |
| 3,902,622 | 9/1975 | Emery | 217/26.5 |
| 3,907,161 | 9/1975 | Martin | 414/795.6 X |
| 3,910,411 | 10/1975 | Deeren | 206/422 |
| 3,997,057 | 12/1976 | Craig | 206/507 |
| 4,012,530 | 3/1977 | Holden | 426/124 |
| 4,088,259 | 5/1978 | Sutton | 229/2.5 EC |
| 4,101,049 | 7/1978 | Wallace et al. | 229/2.5 R |
| 4,195,743 | 4/1980 | Emery | 217/265 |
| 4,305,691 | 12/1981 | Mayer | 414/797.8 X |
| 4,328,908 | 5/1982 | Temming | 414/795.6 X |
| 4,333,571 | 6/1982 | Martelli | 206/499 |
| 4,355,731 | 10/1982 | Carroll et al. | 217/26.5 |
| 4,448,344 | 5/1984 | Lord et al. | 229/2.5 EC |
| 4,465,225 | 8/1984 | Bixler et al. | 229/2.5 EC |
| 4,636,392 | 1/1987 | Toshitsugu | 426/110 |
| 4,759,935 | 7/1988 | Toshisugu | 426/110 |
| 4,789,291 | 12/1988 | Allan | 414/797.8 X |
| 4,821,901 | 4/1989 | Bixler | 217/18 |
| 5,205,410 | 4/1993 | Kuipers et al. | 206/386 |
| 5,533,623 | 7/1996 | Fischer | 206/518 |
| 5,597,073 | 1/1997 | Kocis | 206/521.8 X |

FOREIGN PATENT DOCUMENTS

| | | | |
|---|---|---|---|
| 52-43268 | 5/1977 | Japan | 414/797.8 |

*Primary Examiner*—Janice L. Krizek
*Attorney, Agent, or Firm*—Seed and Berry LLP

[57] ABSTRACT

A packing tray of the type for packing fruit usable with a denesting apparatus for removing a single packing tray from a stack of trays. The tray has a plurality of cups for containing the fruit. The tray has a plurality of pick receiving areas for receiving picks on the denesting apparatus which engage the tray and remove the tray from the stack. The pick receiving areas are located in a sidewall of the tray, such that the locations of the pick receiving areas are independent of the locations of the cups. The pick receiving areas are shaped to permit substantially unimpeded movement of the picks into the pick receiving areas and clamping of the tray between the picks and adjacent alignment members. The alignment members are located to support the stack of trays while the picks engage a single fruit packing tray.

23 Claims, 5 Drawing Sheets

FRUIT PACKAGING TRAY USABLE WITH A DENESTING APPARATUS

TECHNICAL FIELD

The present invention is directed toward fruit packing equipment and, more particularly, toward a tray and a tray handling apparatus.

BACKGROUND OF THE INVENTION

Shipment of fruit, such as apples, requires packing the fruit so it is not bruised or otherwise damaged while the fruit is in transit. Damage to the fruit may result if the fruit is packed too tightly or packed so loosely that the fruit can be jarred into contact with the walls of its container or other fruit. Padding is often placed between individual pieces of fruit and between the fruit and the container walls to limit movement of the fruit within the container. It is desirable when packing the fruit to maximize the amount of fruit placed in a container, so as to minimize the number of containers required to ship a selected amount of fruit. Minimizing the number of containers also reduces handling costs.

Typically, fruit such as apples are packed in paper fiber trays as disclosed in U.S. Pat. No. 3,732,976, and the trays each have cups shaped and sized for retaining the apples to minimize movement of the apples relative to the tray. The trays are shaped so that when filled with apples or other fruit, they may be stacked one upon another in a packing box for shipment. It is desirable to use common-sized packing boxes and trays having a common outer dimension for fruit of different sizes or shapes. Accordingly, several types of trays having different cup sizes are provided for packing and shipping fruit in the common size packing boxes.

Empty trays are loaded with fruit by separating an individual tray from a stack of trays either by hand or with a denesting machine, aligning the denested tray in a selected position on a conveyor, moving the tray on the conveyor to a fruit loading area, and loading the fruit into the cups of the tray. Separating the tray from the stack by a conventional denesting apparatus includes engaging the selected tray and pressing sharpened portions of the denesting apparatus into the sides of four cups of the tray to engage the tray, and then moving the denesting apparatus away from the stack of trays to pull the engaged tray apart from the stack of trays.

A drawback of the conventional denesting apparatus and trays is that the denesting apparatus has generally cylindrically-shaped or spherically-shaped denesting knobs that press into the cup sides, so the denesting apparatus must be carefully adjusted and aligned with the cups of the selected trays to successfully remove the tray from the stack of trays without damage to the tray. When it is desired to denest a stack of trays having cup configurations different from those of a previous stack, the location of the denesting knobs must be carefully readjusted to match the location of the cups. For instance, if the denesting apparatus is to be used with trays from different manufacturers, trays with different capacities or trays with different cup configurations, the denesting knobs must be adjusted each time a different tray type is used with the denesting apparatus. Since adjustment of the denesting knobs is a time-consuming endeavor and the denesting apparatus is typically unusable while the denesting knobs are being adjusted, the efficiency of the fruit packing process is significantly reduced each time adjustment is required.

A further drawback of the existing trays and denesting apparatus is that the tray manufacturing process often yields trays which have some non-uniform regions in the cup areas that receive the denesting knobs. It is therefore difficult for the denesting apparatus to consistently engage and remove a single fruit packing tray from a stack of trays. In addition, the cups of the trays and the denesting knobs must be carefully aligned to avoid damage to the trays during denesting. Misalignment of the knobs or non-uniformity of the cups may also result in inadequate engagement between the knobs and the cups, preventing the tray from being successfully removed from the stack.

SUMMARY OF THE INVENTION

The present invention is directed toward a tray denesting apparatus and an improved fruit packing tray for use with a denesting apparatus. In a preferred embodiment of the invention, the fruit packing tray includes a base having a plurality of fruit retaining cups sized and positioned according to one of a plurality of cup configurations. The fruit packing tray includes picking-member-receiving portions positioned separate from the fruit retaining cups. Each picking-member-receiving portion is shaped and sized to releasably receive the picks of a tray denesting apparatus, thereby allowing the tray denesting apparatus to releasably engage the tray. The location of the receiving areas on the tray is independent of the size and configuration of the cups in the tray so stacks of trays having different cup sizes and configurations may be denested using the denesting apparatus without having to adjust the location of the picks relative to the tray.

In the preferred embodiment, the tray includes two opposing side wall portions integrally connected to the base portion, and opposing end wall portions integrally connected to the base portion and extending between the side wall portions. Each of the pick receiving areas is formed in a selected one of the side wall portions and defined by a pick-engaging side surface extending partially between the end walls, a substantially flat lower surface extending away from the pick-engaging side surface toward the opposing side wall portion, and a substantially flat end surface extending away from the pick-engaging side surface toward the opposing side wall portion and also away from the lower surface. The pick receiving area is sized to allow substantially unimpeded motion of the pick into the receiving area and into secure engagement with the pick-engaging side surface. In this embodiment, the tray has four pick receiving areas, two spaced apart from each other in each of the opposing side wall portions. Each of the pick receiving areas is generally opposite a pick receiving area in the opposing side wall portion.

The denesting apparatus is adapted to remove a single fruit packing tray from a stack of such trays. In the preferred embodiment, the denesting apparatus includes a picking head having a frame, a plurality of tray alignment guides connected to the frame for aligning a selected tray relative to the frame, and a plurality of picks movably connected to the frame for engaging the tray at the pick receiving areas. The stack of trays is retained on the denesting apparatus and positioned above the picking head, so the lowermost tray is engaged by the picks for removal from the bottom of the stack. The picks are shaped and sized to engage the side surfaces of the pick receiving areas of the tray without contacting the cups in the tray's base portion. The picking head is movable as a unit relative to the stack of trays so the lowermost tray engaged by the picks is separated from the stack and moved to a selected position.

The denesting apparatus includes movable stack positioning blades, which align the stack of trays relative to the picking head. The blades are movable to releasably engage the stack, so the stack can be released and moved onto the picking head frame. The tray alignment guides align the lowermost tray of the stack relative to the frame in a position that permits the picks to move into the pick receiving areas and into engagement with the side surfaces. The frame supports the weight of the stack so the motion of the picks is not impeded by the weight of the stack.

The present invention also provides a method for removing a single fruit packing tray from a stack of trays. The method of the preferred embodiment includes moving a picking head toward a stack of trays such that tray alignment guides on a frame of the picking head engage one tray in the stack and align the one tray relative to the picking head, and moving picks located on the picking head into pick receiving areas located on side wall portions of the tray so as to engage the tray. As the picks engage side surfaces of the pick receiving areas, the picks clamp the tray between the picks and the tray alignment guides, permitting the picking head to retain the one tray. The picking head is moved away from the stack after the one tray is engaged, with the picking head thereby removing the one tray from the stack.

In the method of the preferred embodiment, the stack of trays is removably retained above the picking head by movable blades. The blades move to a released position and the stack moves onto the frame such that the stack is positioned between the tray alignment guides with the tray alignment guides positioning the lowermost tray of the stack in a selected position relative to the picking head to permit the picks to engage the lowermost tray substantially unimpeded by the weight of the stack.

These and other aspects of this invention will become evident upon reference to the following detailed description and attached drawings.

DETAILED DESCRIPTION OF THE INVENTION

As mentioned above, the present invention is directed toward a fruit packing tray and apparatus for denesting a stack of fruit packing trays. The features of the tray and apparatus permit trays of varying capacities and cup configurations to be used with the same denesting apparatus without requiring adjustment of the apparatus.

Figure 1:
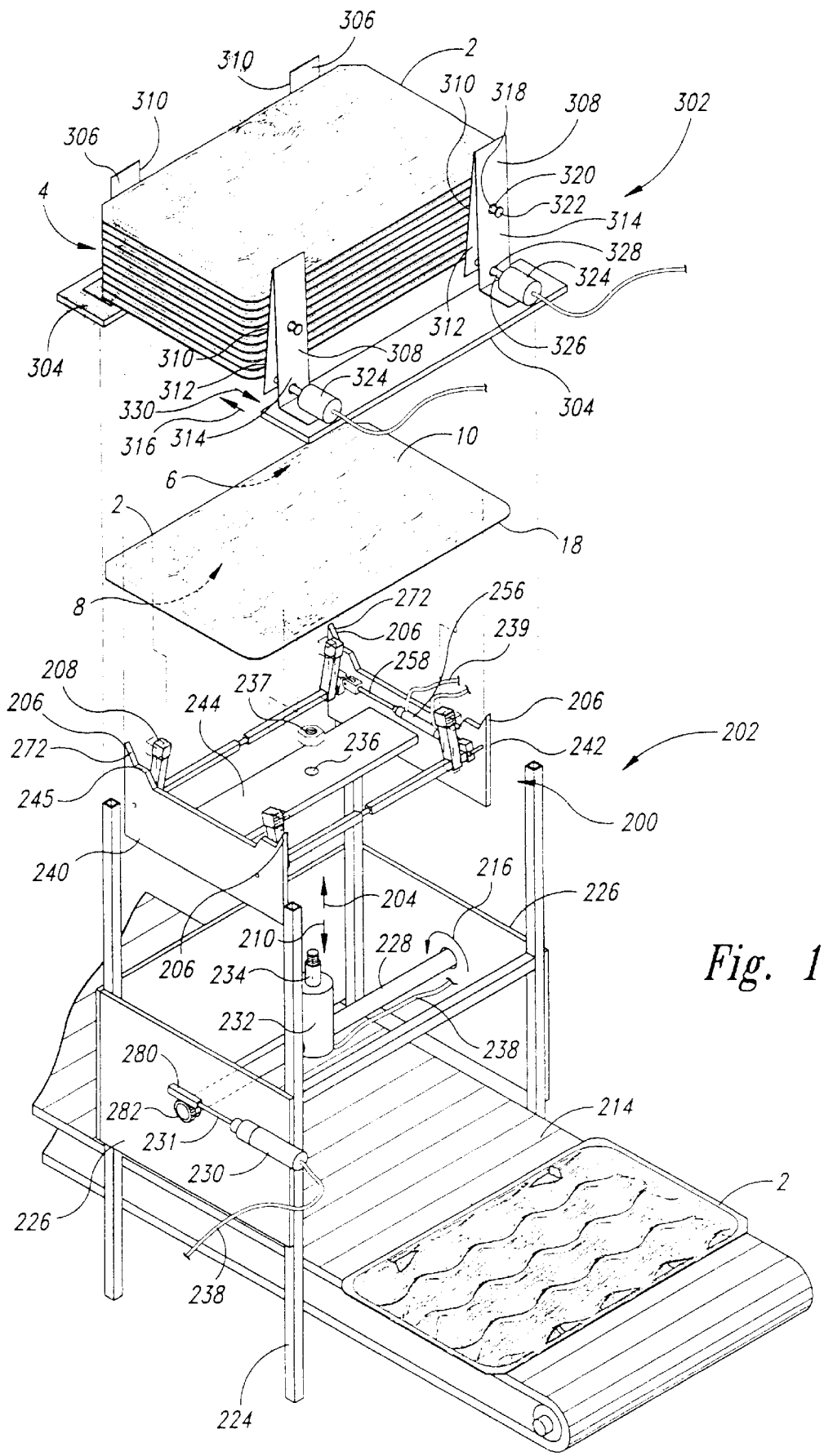
FIG. 1 is an exploded top isometric view of fruit packing trays and a denesting apparatus in accordance with the present invention, one fruit packing tray being shown inverted and separated from a stack of inverted trays which is positioned above a picking head of the denesting apparatus, and another fruit packing tray being shown in a non-inverted position on a conveyor belt of the denesting apparatus.

A representative fruit packing tray 2 and picking head 200 in accordance with a preferred embodiment of the present invention are shown in the drawings for purposes of illustration. As is best seen in FIG. 1, a plurality of inverted fruit packing trays 2 forming a stack 4 are received by a tray denesting apparatus 202, which includes the picking head 200. Each of the trays 2 has pick receiving areas 6 located in a selected position to removably receive a portion of the picking head 200 to allow the picking head to engage the tray and separate it from its position at the bottom of the stack 4. Each tray 2 also has a plurality of cups 8 shaped and sized to receive fruit therein. Although the number, size and configuration of the cups 8 of different tray styles may be different, the selected position of the pick receiving areas 6 is the same for all style trays. Accordingly, the position of the pick receiving areas 6 is independent of the number, size and configuration of the cups 8 in the tray 2 and the picking head 200 can operate with all style trays without adjustment.

The picking head 200 is movable in an upward direction as indicated by the arrow 204 between lowered and raised positions relative to the stack 4 of trays 2, and the picking head has tray alignment guides 206 that engage the lowermost, inverted tray of the stack when the picking head is in the raised position. The picking head 200 also has picks 208 that move into the pick receiving areas 6 and clamp the tray 2 against the tray alignment guides 206. Once the tray 2 has been clamped, the picking head 200 and tray move as a unit away from the stack 4 as indicated by arrow 210 toward the lowered position in a downward direction. The picking head 200 and the tray 2 it carries are also rotated as indicated by the arrow 216 until the tray is in an upright or a non-inverted position and is positioned over a conveyor belt 214 located below the picking head. The picks 208 then release the tray 2 and allow it to drop onto the conveyor belt 214. The conveyor belt 214 moves the tray 2 away from the picking head 200 into position for eventual loading of fruit. The picking head 200 is then rotated as indicated by arrow 216 and moved upward as indicated by arrow 204 to the raised position and into engagement with the new lowermost tray 2 in the stack 4.

Figure 2:
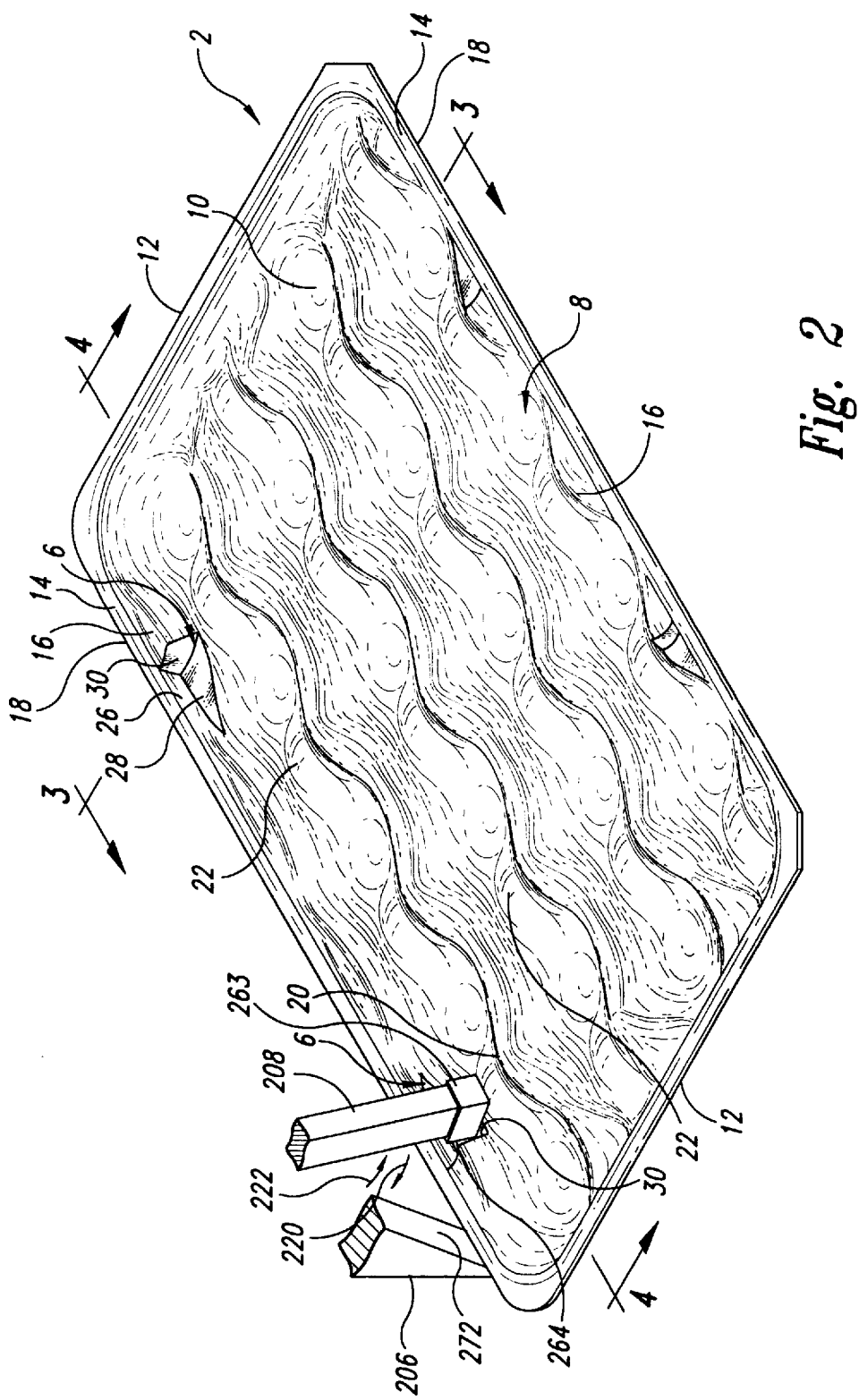
FIG. 2 is an enlarged top isometric view of a fruit packing tray of FIG. 1 in a non-inverted position, showing pick receiving areas in side walls of the tray with one of the pick receiving areas receiving one pick of the picking head, shown partially cut away.
Figure 3:
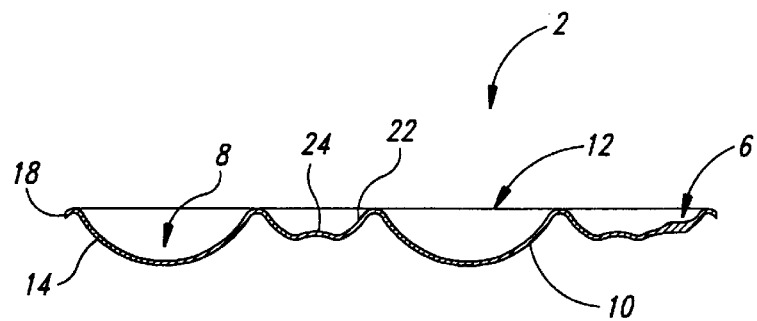
FIG. 3 is an enlarged cross-sectional view of the fruit packing tray taken substantially along line 3—3 of FIG. 2.
Figure 4:
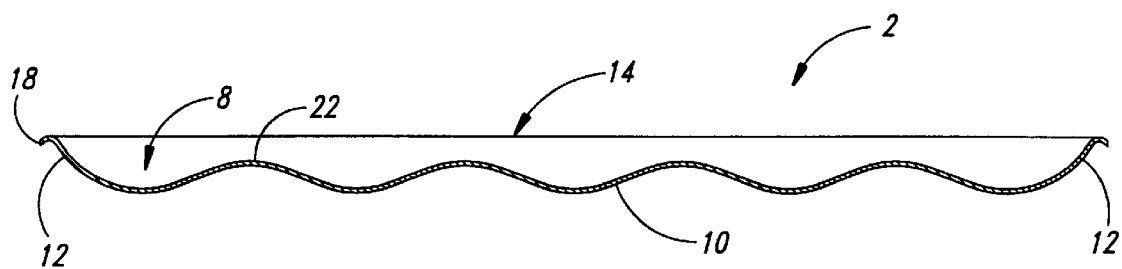
FIG. 4 is an enlarged cross-sectional view of the fruit packing tray taken substantially along line 4—4 of FIG. 2.

The features of the fruit packing tray 2 of the present invention are shown in more detail in FIGS. 2–4. The tray 2, shown in an upright position in FIGS. 2–4, has a base portion 10 with the plurality of cups 8 therein. The tray 2 also includes a pair of opposing endwall portions 12 which are integrally connected to the base portion 10 and which project generally upwardly away from the base portion. The tray 2 has a pair of opposing sidewall portions 14 extending between the endwall portions 12 and integrally connected to the base portion 10 and the endwall portions. The sidewall portions 14 also project generally upwardly away from the base portion 10. As best seen in FIG. 2, the sidewall portions 14 have contoured projections 16 which project inwardly toward the opposite sidewall portion to form a portion of the cups 8 positioned adjacent to the sidewall portion, and outer edges 18 defining a rim along the sidewall portions. The tray 2 of the preferred embodiment has a substantially rectangular shape, though alternate embodiments of the tray have different shapes, such as square.

The cups 8 in the base portion 10 are arranged in offset rows extending between the end portions 12 of the tray 2 and aligned parallel with the sidewall portions 14. Adjacent rows are separated by a contoured ridge 20 that is integrally connected to the cups 8. The contoured ridge 20 projects upwardly and extends in a serpentine path between the endwall portions 12.

Each cup 8 in a row of cups is separated from an adjacent cup by a bridge 22 extending therebetween. As best seen in FIGS. 3 and 4, the bridge 22 has sufficient height to prevent fruit from moving along the row from one cup 8 to another. The bridge 22 has a ridge 24 located approximately midway between the cups 8, such that the bridge is convex in cross-section in a first direction extending between the endwall portions 12, and convex in cross-section in a second, transverse direction extending between the sidewall portions 14. In the preferred embodiment the cups 8 are shaped and sized to receive and retain apples or generally spherical fruits although the cups may also be adapted to retain more non-spherically shaped fruit, such as pears or the like.

FIG. 2 illustrates an apple packing tray 2 sized and configured to hold eighteen apples of a particular size so that four trays filled with the apples snugly fit in a conventional sized apple packing box (not shown). Accordingly, by using the trays 2, seventy-two apples are snugly packed in an apple packing box. The snug fit prevents the apples from moving excessively within the cups 8 relative to the tray 2 thereby minimizing damage to the fruit. In other embodiments of the invention, the trays 2 have different cup configurations and numbers and sizes of cups, so the trays hold between 9 and 36 apples or other pieces of fruit, to be safely packed in the conventional apple packing box.

In a preferred embodiment, the tray 2 is a unitary structure formed of molded paper fiber. In an alternate embodiment, the trays are made from foam, plastic, or some other material preferably having a sufficiently shock-absorbing property.

As best seen in FIG. 2, the sidewall portions 14 each have two spaced-apart pick receiving areas 6 formed therein. Each of the pick receiving areas 6 is shaped to removably receive and engage the pick 208 of the picking head 200. The pick receiving area 6 is defined by a pick engagement side surface 26 extending a selected short distance between the endwall portions 12, a substantially flat lower surface 28 extending away from the side surface 26 toward the opposing sidewall portion 14, and an end surface 30 extending away from both the lower surface 28 and the side surface 26. The side surface 26 is substantially flat and substantially parallel to the opposing sidewall portion 14. The flat side surface 26 provides a substantially flat area that is sized so the pick 208 can move into secure engagement with the side surface, thereby assuring that the pick will securely clamp the tray 2 against a corresponding one of the tray alignment guides 206 for removal from the stack 4. The flat side surface 26 has a length that is greater than the width of the portion of the pick 208 that engages the tray 2 so as to provide a margin for misalignment, for example, in the event that the tray 2 is warped. This margin for misalignment provides further assurance that the tray 2 will be successfully engaged and removed from the stack 4 of trays (shown in FIG. 1).

In the preferred embodiment, the end surface 30 of each pick receiving area 6 is substantially flat and generally perpendicular to the lower surface 28. The end surface 30 extends upwardly from the lower surface 28 and the end surface terminates at the top of a selected contoured projection 16 in the sidewall portion 14. The end surface 30 also extends outwardly toward the opposing sidewall portion 14 and away from the side surface 26 to the end of the contoured projection 16. Accordingly, the pick receiving area 6 of the embodiment illustrated in FIG. 2 has the appearance of extending into the contoured projection 16 and forming an indented or recessed area therein.

The lower surface 28 is also substantially flat and it extends away from the end surface 30 along the length of the side surface 26. The side surface 26, the lower surface 28 and the end surface 30, which collectively form the pick receiving area 6 are positioned and sized to allow substantially unobstructed pivotal motion of the pick 208 through the pick receiving area toward and away from the side surface 26 as the pick engages when in a clamped position and disengages when in a released position the side surface, as shown by arrows 220 and 222 in FIG. 2 and as will be described in greater detail below.

In the preferred embodiment, each sidewall portion 14 has two pick receiving areas 6 therein, and each pick receiving area is positioned generally opposite one of the pick receiving areas in the opposing sidewall portion. The pick receiving areas 6 in a respective sidewall portion 14 are each approximately three to six inches from a respective endwall portion 12. The location of the pick receiving areas 6 relative to the endwall portions 12 is independent of the number and configuration of the cups 8 in the tray 2. Further, the pick receiving areas 6 are smaller in size than the cups 8 and not designed to hold fruit therein. As an example, the tray 2 in the illustrated embodiment of the present invention includes eighteen cups 8. In an alternative style tray (not shown) with a different cup size and configuration, the pick receiving areas are located at the same position as the illustrated tray, but the tray has twenty-five cups. Accordingly, two different styles of trays according to the present invention having significantly different cup sizes and configurations can be used with the same denesting apparatus 202 (FIG. 1) using the same picking head 200 without having to adjust the location of the picks 208 on the picking head for each of the different style trays.

Figure 5:
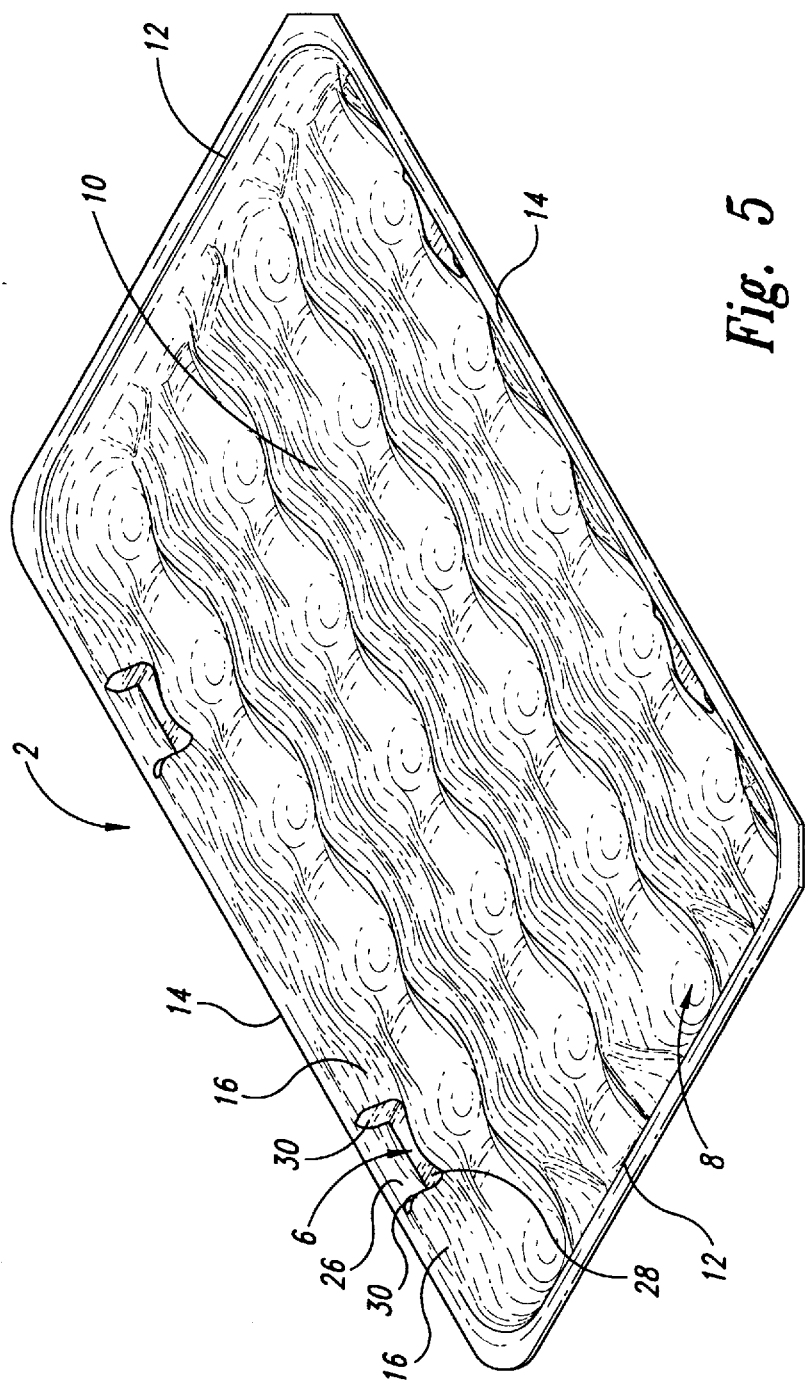
FIG. 5 is an enlarged top isometric view of an alternate embodiment of the fruit packing tray of FIG. 1 in which the pick receiving areas each include two end wall portions.

The end surfaces 30 of the pick receiving areas 6 formed in one of the sidewall portions 14 of the embodiment illustrated in FIG. 2 face each other because of the location of the projection 16 and the cup configuration in the row of cups 8 adjacent to the sidewall portion. The pick receiving areas 6 in the other sidewall portion 14 face away from each other because of the location of the projections 16 and the cup configuration in the row of cups 8 adjacent to that sidewall portion. In alternate style trays wherein the tray 2 has a different number of cups 8, the projections 16 are located at different positions along the sidewall portions 14, so the pick receiving areas 6 intersect the projections differently. Accordingly, the end surfaces 30 in some alternate embodiments are positioned on opposite ends of the lower surface 28. In one alternate embodiment illustrated in FIG. 5, wherein the tray 2 has twenty-two cups 8, each of the pick receiving areas 6 in the sidewall portions 14 is located generally between two adjacent projections 16. Accordingly, the pick receiving area 6 extends into each of the two adjacent projections 16, and two end surfaces 30 are formed, with one at each end of the lower surface 28 of the pick receiving area 6. Regardless of the shape, the pick receiving area 6 between the projections 16 is sized to removably receive the pick 208 of the picking head 200 so that the pick securely engages the side surface 26 when the tray 2 is being separated from the stack 4 as illustrated in FIG. 1.

As best seen in FIG. 1, the denesting apparatus 202 has a conventional frame structure 224 that includes a pair of opposing frame sides 226 and a pivotable rod 228 extending between the frame sides. The rod 228 is rotatably mounted to the frame sides 226, and the picking head 200 is securely mounted to the rod such that the picking head rotates with the rod relative to the frame sides. A pneumatic actuator 230 has a push rod 231 that retains a rack 280 at one end. The rack 280 engages in a conventional manner a pinion 282 that is fixedly attached to an end of the rod 228 so as to selectively rotate the rod and the picking head 200 relative to the frame sides 226 and relative to the conveyor 214 below the picking head. The actuator 230 is coupled to a conventional pressurized air source (not shown) by a conventional pneumatic line 238.

Another pneumatic actuator 232 is securely mounted to the rod 228 at a position between the frame sides 226, and has a push rod 234 that is fixedly attached to the picking head 200. The actuator 232 and picking head 200 rotate as a unit with the rod 228. The actuator 232 moves the push rod 234 between a retracted position and an extended position, thereby moving the picking head 200 toward and away from the rod 228, as indicated by arrows 210 and 204, respectively. The actuator 232 is coupled to a conventional pressurized air source (not shown) by a conventional pneumatic line 238.

The picking head 200 includes opposing left and right side members 240 and 242, respectively, connected by a cross member 244 which extends therebetween. The cross member 244 has an aperture 236 therein that receives the threaded top portion of the push rod 234, and a nut 237 is threaded onto the top portion of the push rod to securely connect the picking head 200 to the actuator 232.

Figure 6:
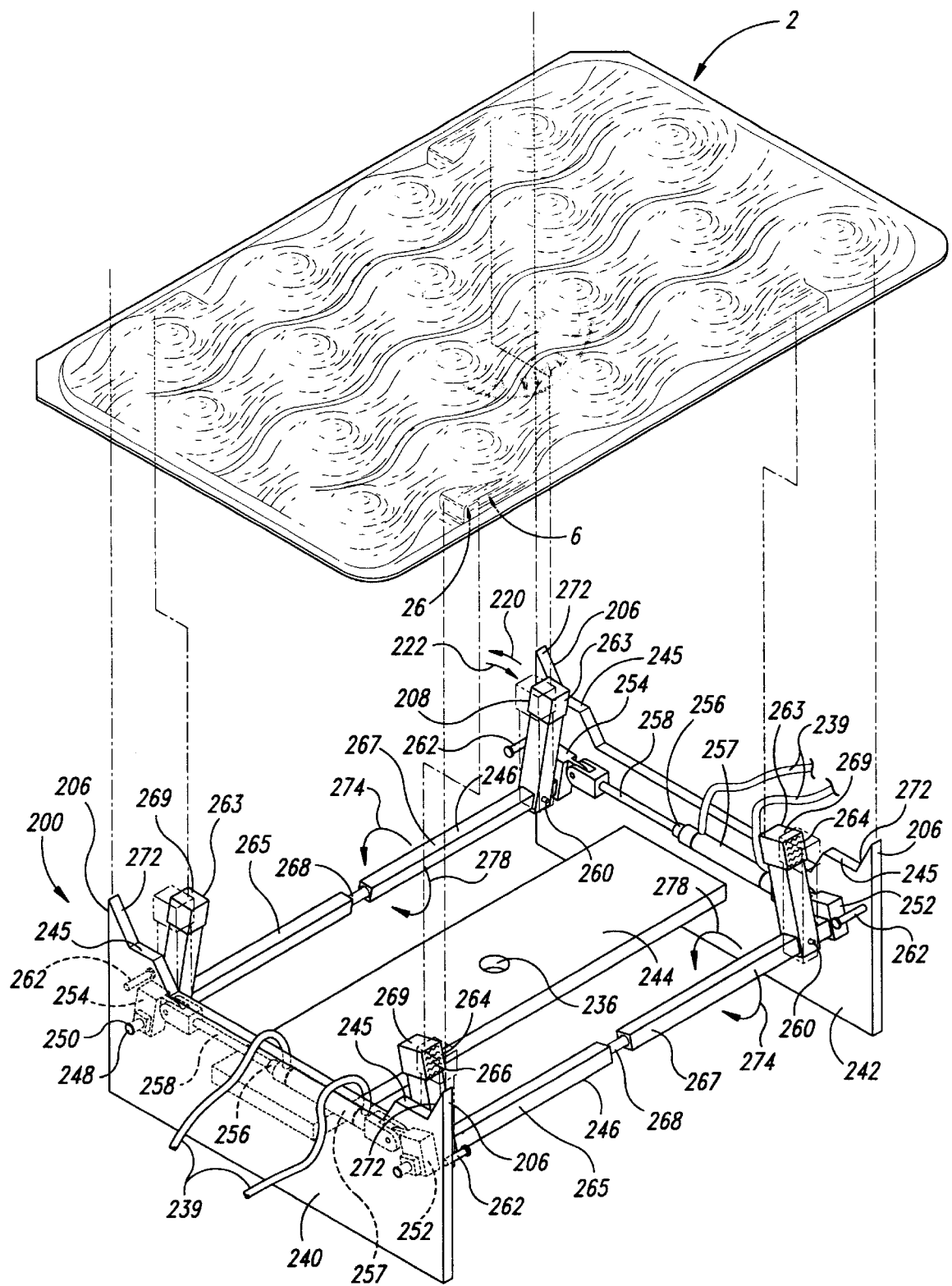
FIG. 6 is an enlarged exploded top isometric view of the picking head and the single inverted tray of FIG. 1, with the picks on the picking head being shown in solid line in a released position, and shown in phantom line in a clamped position.

As best seen in FIG. 6, the side members 240 and 242 of the picking head 200 are spaced apart by a distance which is less than the overall length of the tray 2, and each of the side members have a pair of integrally formed tray alignment guides 206 that project away from the respective side member. The pair of alignment guides 206 are located on opposite ends of the respective side member. The tray alignment guides 206 are arranged coplanar with the respective side members 240 and 242. Each alignment guide 206 has a generally flat support shoulder 245 and a sloped inner alignment surface 272 that extends away from the support shoulder and slopes away from the other alignment guide on the respective side member. The inner alignment surfaces 272 are shaped and sized to engage the outer edges 18 of the lowermost tray 2 of the stack 4 and guide the lowermost tray 2 onto the support shoulders 245 and center the tray relative to picking head 200 when the tray is moved onto the picking head, as discussed in greater detail below. The picks 208 of the picking head 200 are positioned adjacent to the side members 240 and 242 and are mounted to adjustment rods 246 that extend between the side members 240 and 242 substantially parallel to the cross member 244.

The picking head 200 of the preferred embodiment has two adjustment rods 246 that are located on opposite sides of the cross member 244, and each adjustment rod retains two picks 208 in a selected position adjacent to a respective side member 240 and 242 and a respective one of the alignment guides 206. Round retaining pins 248 are provided at both ends of the adjustment rods 246, and each of the retaining pins extends into a respective aperture 250 in side members 240 and 242. The retaining pins 248 are sized so the adjustment rods 246 and the picks 208 retained thereon are rotatable relative to the side members 240 and 242. Connecting blocks 252 and 254 are securely attached to the ends of each adjustment rod 246 adjacent to a respective one of the side members 240 and 242 so each connecting block moves with its respective adjustment rod as a unit. Linear actuators 256 each having a pneumatic cylinder 257 and a push rod 258 extend between the adjustment rods 246, one adjacent to each of the side members 240 and 242, and connect to the connecting blocks 252 and 254. The pneumatic cylinder 257 is pivotally connected at its end to one of the connecting blocks 254 and the push rod 258, which is moved axially by the pneumatic cylinder, is pivotally connected at its end to the other of the connecting blocks. The pneumatic cylinders 257 are each double acting and supplied with pressurized air through pneumatic lines 239 that selectively retract and extend the push rods 258 to move them axially into or out of the pneumatic cylinders, respectively. As the push rod 258 moves into or out of the pneumatic cylinder 257, the respective connecting blocks 252 and 254 are rotated toward or away from each other causing the adjustment rods 246 to rotate clockwise or counterclockwise.

Each of the picks 208 is adjustably attached at a lower end to a respective adjustment rod 246, and each pick is securely retained on the adjustment rod in a selected position relative to the side members 240 and 242 by a set screw 260 that extends through the pick and engages the adjustment rod. Accordingly, the picks 208 rotate with the adjustment rods as indicated by arrows 274 and 278 between a clamped position, shown in phantom line in FIG. 6, and a released position, shown in solid line, to clamp or release the tray 2 from the picking head 200. Stops 262 are connected to the side members 240 and 242 adjacent to the connecting blocks 252 and 254, and positioned to limit the rotational movement of the connecting blocks 252 and 254, thereby preventing over-rotation of the adjustment rods 246 and picks 208 past the clamped position (shown in phantom line), which could cause damage to the tray 2.

As best seen in FIG. 6, each of the adjustment rods 246 has a left end portion 265 rotatably connected to the left side member 240, and a right end portion 267 rotatably connected to the right side member 242. The left and right end portions 265 and 267 of each adjustment rod 246 are rotatably connected together by a connecting pin 268 extending therebetween so the left end portions 265 and the right end portions 267 can independently rotate relative to each other. The independently rotatable left and right portions 265 and 267 prevent binding of the adjustment rods 246 and actuators 256 in the event the linear actuators 256 are activated but are not synchronized or do not produce the same extent of push rod travel. In a preferred embodiment, a single solenoid controls actuation of both linear actuators 256 so that the linear actuators are substantially synchronized to simultaneously move all four of the picks 208 between the clamped and released positions.

As shown in FIG. 6, each pick 208 has a free end portion 263 positioned away from the adjustment rod 246 to which it is attached. The free end portion 263 has an outer face surface 264 that engages the side surface 26 of the pick receiving area 6 of the tray 2 when the pick is in the clamped position. The outer surface 264 contains serrations 266 that provide enhanced gripping of the tray's side surface 26. The pick 208 also includes an upper surface 269 which in the preferred embodiment is flat to permit substantially unobstructed passage into and out of the tray's pick receiving area 6 past the lower surface 28 as the pick 208 moves between the clamped and released positions.

The picks 208 are adjustably positionable along the adjustment rods 246 by releasing the set screws 260 and sliding the picks to a selected position relative to the side members 240 and 242. Accordingly, the position of the picks 208 may be adjusted, for example, when denesting conventional trays that do not have pick receiving areas in accordance with the present invention.

When the picks 208 are securely positioned on the adjustment rods 246 for use with the tray 2 of the present invention, the picks are located so as to move into and out of the pick receiving areas 6 of the tray when the tray is aligned and supported on the support shoulders 245 of the alignment guides 206. The free end portions 263 of the picks 208 are spaced apart from the alignment guides by a selected distance so the outer surfaces 264 of the free end portions are out of engagement with the tray 2 when the picks are in the released position. Accordingly, the tray is freely movable onto and off of the alignment guides 206.

When the picks are moved to the clamped position, each of the free end portions 263 is spaced apart from the respective alignment guide 206 so the free end portions are within the pick receiving areas 6 of the tray 2 on the picking head. The outer surfaces 264 of the free end portions 263 securely engage the side surfaces 26 of the pick receiving areas 6 so as to press the portion of the tray 2 adjacent the pick receiving areas against the alignment guides 206. As a result, the picks 208 releasably clamp the tray 2 onto the picking head 200. The tray 2 and the picking head 200 are then movable as a unit relative to the stack 4 of trays on the denesting apparatus 202 (shown in FIG. 1). The picks 208 are positioned so as not to excessively pinch the tray 2 when the picks are in the clamped position so as not to damage the tray.

As best seen in FIG. 1, the stack 4 of trays 2 is retained on the denesting apparatus 202 in an inverted position by a stack holding assembly 302 that is securely mounted to the frame structure 224. The stack holding assembly 302 holds the stack 4 of trays 2 in a selected position above the picking head 200 to allow the lowermost tray of the stack to be engaged by the picking head and separated from the stack. The tray holding assembly 302 has a pair of spaced-apart base plates 304 fastened to the frame structure 224. Two fixed tray-retaining blades 306 are mounted to one of the base plates 304 and spaced apart from each other so as to engage one outer edge 18 of the trays 2 in the stack 4. Two movable tray-retaining blades 308 are mounted to the other of the base plates 304 and spaced apart from each other so each movable blade is substantially opposite a respective one of the fixed blades 306 to engage the opposite edge 18 of the trays 2 in the stack 4.

In the preferred embodiment, the fixed and movable blades have sharpened edges 310 which grip and retain the stack of trays in a selected position above the picking head 200. The movable blades 308 are each preferably formed from a bent metal sheet to provide a movable portion 312 toward the trays 2 and a fixed portion 314. The fixed portion is securely fastened to the other base plate 304, and the movable portion 312 is movable relative to the fixed portion between a stack released position and an engaged position. The movable blade 308 has a spring quality that biases the movable portion 312 away from the fixed portion 314 toward the engaged position and toward the opposing fixed blade 306. Accordingly, the movable portion 312 is biased to engage the stack 4 of trays 2 as indicated by arrow 316.

In the engaged position, the movable blades 308 are pressed into firm engagement with the stack 4 to hold the stack in a fixed position above and out of engagement with the picking head 200. In the stack released position, the distance between the fixed blades 306 and the opposing movable portion 312 of the movable blades 308 is greater than the width of trays 2, so the stack holding assembly 302 releases the stack 4 and the stack drops onto the picking head 200. When the stack 4 is released, the support shoulders 245 of the alignment guides 206 receives the stack and supports the lowermost tray 2 of the stack so the picking head can clamp onto the lowermost tray. When the movable portions 312 of the movable blades 308 are moved back to the engaged position, the fixed and movable blades 306 and 308 support the stack to allow the picking head 200 to separate or denest the lowermost tray 2 from the stack 4.

A pair of actuators 324 are mounted to the other base plate 304 adjacent to the movable blade 308. Each actuator 324 has an actuator rod 326 that passes through a hole 328 in the fixed portion 314 and that securely connects to the movable portion 312 of the respective movable blade 308. The actuator 324 securely holds moveable portion 312 in the stack engaged position. When the actuator is activated and the actuator rod 326 retracted, the actuator rod 326 is drawn through the hole 328 and pulls the movable portion 312 toward the fixed portion 314 to the stack released position, as indicated by arrow 330, thereby releasing the stack 4. A stop 318 is attached to the movable portion 312 of each of the movable blades 308 and passes through a hole 320 in the fixed portion 314. The stop 318 has a head 322 which has a larger diameter than the hole 320, so the head is engageable with the fixed portion 314 to limit inward travel of the movable portion 312 when the stack 4 is removed from the stack holding assembly 302.

The operation of the denesting apparatus 202 is discussed below with reference to FIGS. 1 and 6. To begin operation, the stack of trays 4 is placed above the picking head 200 between the opposing pairs of fixed blades 306 and movable blades 308. The movable portions 312 of the movable blades 308 are moved to the engaged position to hold the stack 4 above the picking head 200. The picking head 200 is positioned via rotation of the rod 228 in an upright position as indicated in FIG. 1 with the picks 208 and the alignment guides pointing upwardly toward the bottom of the stack 4 of trays 2. The actuator 232 is in a lowered position so the picking head is out of engagement with the lowermost tray 2 in the stack. The picks 208 are moved to the released position by the linear actuators 256. The pneumatic actuator 232 is then actuated to move the push rod 234 to the extended position and vertically move the picking head 200 upward from the lowered position toward a raised position and toward the stack of trays 4 as indicated by arrow 204. As the picking head 200 approaches the raised position, the sloped inner alignment surfaces 272 of one or more of the tray alignment guides 206, engage the outer edges 18 of the lowermost tray 2 of the stack 4 and align the stack 4 of inverted trays relative to the picking head. Once the tray alignment guides 206 have engaged the lowermost tray 2, the movable portions 312 of the movable blades 308 are moved to the stack released position as indicated by arrow 330 in FIG. 1, thereby releasing the stack 4 so the stack rests on the support shoulders 245 of the alignment guides 206.

The linear actuators 256 are then activated and the push rods 258 are extended to move the picks 208 from the released position into the pick receiving areas 6 of the tray and to the clamped position without interference caused by the weight of the stack 4. Activating the linear actuator 256 axially extends the push rod 258 outwardly from the pneumatic cylinders 257, thereby rotating the opposing connecting blocks 252 and 254 away from each other and causing adjustment rods 246 to rotate as indicated by arrows 274 in FIG. 6. As the adjustment rods 246 so rotate, the picks 208 rotate toward the alignment guides 206, as indicated by arrow 220 in FIG. 6, and into the pick receiving areas 6. The picks 208 continue to rotate until the connecting blocks 252 and 254 engage the stops 262 at which time the picks 208 are in the clamped position, shown in phantom line.

In the clamped position, the outer surfaces 264 of the picks 208 firmly engage the side surfaces 26 of the pick receiving areas 6. The tray alignment guides 206 continue to engage the tray outer edges 18 so that the lowermost tray 2 of the stack 4 is clamped between the tray alignment guides and the free end portions 263 of the picks 208. When the picking head 200 has clamped the lowermost tray 2 of the stack 4, the movable blades 308 are moved to the engaged position by the actuators 324, as indicated by arrow 316 in FIG. 1, and clamp the stack between the movable blades 308 and the fixed blades 306.

The actuator 232 connected to the picking head 200 is then actuated to move the push rod 234 to the retracted position moving the picking head 200 downwardly to the lowered position, as indicated by arrow 210 in FIG. 1, away from the stack 4 carrying the clamped tray 2 along. The tray 2, clamped by the tray alignment guides 206 and the picks 208, is thereby separated from the stack 4, so that the clamped tray is denested from the stack. The force needed to pull the lowermost tray 2 away from the stack is less than the retaining force exerted on the rest of the stack by the fixed and movable blades 306 and 308, so that the clamped tray 2 is pulled downward free from the stack without pulling the entire stack downwardly relative to the stack holding assembly 302 as the picking head 200 moves downward. The clamping force exerted on the clamped tray 2 by the tray alignment guides 206 and the picks 208 also exceeds any forces which might tend to bind the tray 2 to the stack 4, so that only the clamped tray 2 and no other trays in the stack are denested as the picking head 200 moves downward.

The picking head 200 continues to move downwardly to the lowered position and the actuator 230 connected to the rod 228 below the picking head is actuated. The push rod 231 of the actuator 230 is partially withdrawn into the actuator, causing the rod 228 and the picking head to rotate as a unit as indicated by arrow 216 in FIG. 1. When the rod 228 has been rotated sufficiently to move the picking head 200 into an inverted position, the clamped tray 2 is in a non-inverted position over the conveyor 214. The picking head then releases the tray 2 onto the conveyor belt 214. To release the tray 2, the liner actuators 256 are actuated to rotate the connecting blocks 252 and 254 toward each other and the adjustment rods 246 as indicated by arrows 278 in FIG. 6, thereby rotating or pivoting the picks 208 as indicated by arrow 222 away from the clamped position, shown in phantom line, out of the pick receiving areas 6 of the tray and toward the released position, shown in solid line. As the picks 208 move out of the pick receiving areas 6, they disengage from the side surfaces 26 of the pick receiving areas, thereby unclamping the tray 2, and allowing the now non-inverted tray to drop to the conveyer belt 214 below. The actuator 230 then rotates the rod 228 as indicated by arrow 216 in FIG. 1 until the picking head 200 returns to an upright position below the stack 4 with the picks 208 in the released position so the picking head is ready to move into engagement and denest the new, lowermost tray 2 in the stack 4.

Although the denesting apparatus 202 shown in the figures contains a single picking head 200, other configurations in which the denesting apparatus has multiple picking heads are used in alternate embodiments. In some cases, for example, loaded trays stacked upon each other in a fruit packing box may be of two different types in order to maximize the number of fruit packed in a box. The box is packed by alternating loaded trays of the first type with loaded trays of the second type. To this end, a denesting apparatus 202 having two picking heads 200 is used to denest the different trays to be loaded into the box. One picking head is positioned beneath a stack of trays of the first type and the other picking head is positioned beneath a stack of trays of the second type. In operation, the picking heads 200 operate in a staggered or alternating fashion so as to denest first a tray of the first type, then a tray of the second type in a repetitive cycle, thereby conveying to the fruit loading area an alternating sequence of trays of each type. The alternating sequence is maintained as each tray is loaded and packed into boxes.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A fruit packing tray for holding fruit, the tray having a selected size and a capacity, the tray being usable with a tray denesting apparatus having picking members adapted to releasably engage the tray, comprising:

a base having a plurality of fruit retaining cups positioned therein;

first and second end portions attached to the base, the first end portion being opposite the second end portion;

first and second side portions spaced apart from each other, attached to and projecting away from the base and extending at least partially between the first and second end portions; and a first picking-member-receiving portion formed in the first side portion and a second picking-member-receiving portion formed in the second side portion, each of said first and second picking-member-receiving portions being defined by an engagement surface extending a selected distance between the first and second end portions and a lower surface connected to and extending away from the engagement surface, the engagement surface being positioned apart and separate from all the fruit retaining cups, the first and second picking-member-receiving portions each being shaped and sized to releasably receive a respective one of the picking members therein to allow the tray denesting apparatus to releasably engage the engagement surface, the first and second picking-member-receiving portions spaced generally opposite each other, with the location of the first and second picking-member-receiving portions being independent of the selected size and capacity of the tray, whereby a plurality of styles of trays having a plurality of different cup configurations are usable with the same tray denesting apparatus with each of the plurality of styles of trays having first and second picking-member-receiving portions in a same position so that the picking members can engage the picking-member-receiving portions of all of the styles of trays without adjustment regardless of the style of tray.

2. The fruit packing tray of claim 1 wherein each of the first and second picking-member-receiving portions is further defined by an end surface that is connected to the engagement surface and wherein the engagement surface is substantially parallel to the respective first and second side portions, the lower surface and end surface being substantially flat for unobstructed motion of the picking member toward and away from the picking-member-receiving portion, the engagement surface being shaped for engagement by the picking member.

3. The fruit packing tray of claim 1, further comprising a third picking-member-receiving portion formed in the first side portion and being spaced apart from the first picking-member-receiving portion, and a fourth picking-member-receiving portion formed in the second side portion and being spaced apart from the second picking-member-receiving portion, the third and fourth picking-member-receiving portions being generally opposite each other.

4. The fruit packing tray of claim 1, further comprising a third picking-member-receiving portion formed in the first side portion and being spaced apart from the first picking-member-receiving portion, and a fourth picking-member-receiving portion formed in the second side portion and being spaced apart from the second picking-member-receiving portion, the first and second picking-member-receiving portions being generally opposite each other and the third and fourth picking-member-receiving portions being generally opposite each other.

5. A fruit packing tray for holding fruit, the tray usable with a tray denesting apparatus having picking members adapted to releasably engage the tray, comprising:

a base having a plurality of fruit retaining cups formed therein;

a first side portion attached to the base and projecting away from the base;

a second side portion attached to and projecting away from the base and being spaced apart from the first side portion; and a picking-member-receiving portion formed in the first side portion and being defined by an engagement surface extending a selected distance along the first side portion and a lower surface connected to and extending away from the engagement surface, the engagement surface being positioned apart and separate from all the fruit retaining cups, the picking-member-receiving portion being shaped and sized to releasably receive the picking member therein to allow the tray denesting apparatus to releasably engage the engagement surface and remove the tray from a stack of trays.

6. The fruit packing tray of claim 5 wherein the picking-member-receiving portion is located at a position independent of the location of the plurality of fruit retaining cups.

7. The fruit packing tray of claim 5 wherein the picking-member-receiving portion is further defined by an end surface that is connected to the engagement surface and extends toward the second side portion.

8. The fruit packing tray of claim 5 wherein the plurality of fruit retaining cups includes a number of fruit retaining cups within the range of 9 to 36, inclusive.

9. A fruit packing tray for holding fruit, the tray being usable with a tray denesting apparatus having engagement members adapted to releasably engage the tray, comprising:

a base having a plurality of fruit retaining cups formed therein, the fruit retaining cups having a selected size and arrangement;

first and second side portions spaced apart from each other and being attached to the base; and first and second picking-member-receiving portions formed in the first side portion, and third and fourth picking-member-receiving portions formed in the second side portion, each picking-member-receiving portion being shaped and sized to releasably receive a respective one of the engagement members to allow the tray denesting apparatus to releasably engage the tray, the first and second picking-member-receiving portions being spaced a first distance apart from each other, the third and fourth picking-member-receiving portions spaced a second distance apart from each other, the first and second distances being independent of the size and arrangement of the fruit retaining cups.

10. The fruit packing tray of claim 9 wherein each of the picking-member-receiving portions is further defined by an engagement surface extending along a portion of a respective one of the first and second side portions wherein each of the engagement surfaces is separate and independent from the fruit retaining cups, each of the engagement surfaces being shaped for engagement by the engagement member.

11. A fruit packing tray for holding fruit, the tray being usable with a tray denesting apparatus having a picking member adapted to releasably engage the tray, comprising:

a base having a plurality of fruit retaining cups formed therein, the fruit retaining cups being located and sized according to one of a plurality of cup configurations;

first and second side portions attached to the base and being spaced apart from each other; and a picking-member-receiving portion formed in one of the first and second side portions and being positioned at a fixed location along the one of the first and second side portions, the fixed location being independent of the location and size all of the fruit retaining cups, the picking-member-receiving portion being shaped and sized to releasably receive the picking member therein to allow the tray denesting apparatus to releasably engage the tray.

12. The fruit packing tray of claim 11 wherein the base is integrally connected to the first and second side portions.

13. The fruit packing tray of claim 11 wherein the picking-member-receiving portion is adjacent to one of the fruit retaining cups.

14. The fruit packing tray of claim 11 wherein the plurality of fruit retaining cups includes a number of fruit retaining cups within the range of 12 to 35, inclusive.

15. A fruit packing tray for holding fruit, the tray being usable with a tray denesting apparatus having picking members adapted to releasably engage the tray, comprising:

a base having a plurality of fruit retaining cups formed therein, the fruit retaining cups being located and sized according to one of a plurality of cup configurations; and picking-member-receiving portions positioned separate and independent from all the fruit retaining cups, each of the picking-member-receiving portions being shaped and sized to releasably receive a respective one of the picking members therein to allow the tray denesting apparatus to releasably engage the tray independent of the location of the fruit retaining cups.

16. A fruit packing tray of claim 15 wherein one of the picking-member-receiving portions is immediately adjacent to one of the fruit retaining cups.

17. The fruit packing tray of claim 15, further comprising first and second side portions attached to the base and having the picking-member-receiving portions formed therein.

18. The fruit packing tray of claim 15 wherein the plurality of fruit retaining cups includes a number of fruit retaining cups within the range of 9 to 36, inclusive.

19. A fruit packing tray for holding fruit, the tray being usable with a tray denesting apparatus having picking members adapted to releasably engage the tray, comprising:

a base having a plurality of fruit retaining cups formed therein; and picking-member-receiving portions positioned separate and independent from all the fruit retaining cups, each of the picking-member-receiving portions being shaped and sized to releasably receive a respective one of the picking members therein to allow the tray denesting apparatus to releasably engage the tray.

20. The fruit packing tray of claim 19 wherein one of the picking-member-receiving portions is immediately adjacent to one of the fruit retaining cups.

21. A plurality of styles of fruit packing trays interchangeably usable on a denesting apparatus having picking members adapted to releasably engage a selected one of the trays, comprising:

a first style tray having a plurality of first fruit retaining cups arranged in a first cup configuration and having first picking-member-receiving portions separate from the first fruit retaining cups and positioned in a receiving-portion arrangement; and a second style tray having a plurality of second fruit retaining cups arranged in a second cup configuration that is different from the first cup configuration and having second picking-member-receiving portions separate from the second fruit retaining cups and being positioned in the receiving-portion arrangement.

22. A combination of a tray denesting apparatus and a plurality of styles of fruit packing trays, comprising:

a tray denesting apparatus having picking members positioned in a selected picking-member arrangement;

a first style tray having a plurality of first fruit retaining cups arranged in a first cup configuration and having first picking-member-receiving portions separate from the first fruit retaining cups and positioned in a receiving-portion arrangement corresponding to the picking-member arrangement; and a second style tray having a plurality of second fruit retaining cups arranged in a second cup configuration that is different from the first cup configuration and having second picking-member-receiving portions separate from the second fruit retaining cups and being positioned in the receiving-portion arrangement.

23. A fruit packing tray for holding fruit, the tray having a selected size and a capacity, the tray being usable with a tray denesting apparatus having picking members adapted to releasably engage the tray, comprising:

a base having a plurality of fruit retaining cups positioned therein;

first and second end portions attached to the base, the first end portion being opposite the second end portion;

first and second side portions spaced apart from each other, attached to and projecting away from the base and extending at least partially between the first and second end portions;

a first picking-member-receiving portion formed in the first side portion and a second picking-member-receiving portion formed in the second side portion, each of said first and second picking-member-receiving portions being defined by an engagement surface extending a selected distance between the first and second end portions and a lower surface connected to and extending away from the engagement surface, the engagement surface being positioned apart and separate from the fruit retaining cups, the first and second picking-member-receiving portions each being shaped and sized to releasably receive a respective one of the picking members therein to allow the tray denesting apparatus to releasably engage the engagement surface, the first and second picking-member-receiving portions spaced generally opposite each other, with the location of the first and second picking-member-receiving portions being independent of the selected size and capacity of the tray, whereby a plurality of styles of trays having a plurality of different cup configurations are useable with the same tray denesting apparatus with each of the plurality of styles of trays having first and second picking-member-receiving portions in a same position so that the picking members can engage the picking-member-receiving portions of all of the styles of trays without adjustment regardless of the style of tray; and a third picking-member-receiving portion formed in the first side portion and being spaced apart from the first picking-member-receiving portion, and a fourth picking-member-receiving portion formed in the second side portion and being spaced apart from the second picking-member-receiving portion, the first and second picking-member-receiving portions being generally opposite each other and the third and fourth picking-member-receiving portions being generally opposite each other.

* * * * *

UNITED STATES PATENT AND TRADEMARK OFFICE
CERTIFICATE OF CORRECTION

PATENT NO. : 5,827,068
DATED : October 27, 1998
INVENTOR(S) : Russel E. Sims

It is certified that error appears in the above-identified patent and that said Letters Patent is hereby corrected as shown below:

On the title page, item [73], please replace "Michelson Packaging Co.," with --Michelsen Packaging Co.,-- .

Signed and Sealed this

Twenty-second Day of June, 1999

Attest:

Q. TODD DICKINSON

*Attesting Officer*     Acting Commissioner of Patents and Trademarks